Oct. 23, 1962 H. S. PIEN 3,059,710
INDIRECT MEASUREMENT OF VERTICAL FORCES
Filed July 13, 1959 2 Sheets-Sheet 1

INVENTOR
HSIA S. PIEN
BY *Edward C. Hathaway*
ATTORNEY

Oct. 23, 1962 H. S. PIEN 3,059,710
INDIRECT MEASUREMENT OF VERTICAL FORCES
Filed July 13, 1959 2 Sheets-Sheet 2

INVENTOR
HSIA S. PIEN
BY
ATTORNEY

United States Patent Office 3,059,710
Patented Oct. 23, 1962

3,059,710
INDIRECT MEASUREMENT OF VERTICAL FORCES
Hsia S. Pien, Newton, Mass., assignor to Baldwin-Lima-Hamilton Corporation, a corporation of Pennsylvania
Filed July 13, 1959, Ser. No. 826,772
5 Claims. (Cl. 177—136)

This invention relates to fork lift trucks having means for weighing loads on the fork tines, and more particularly to weighing means employing electrical strain gages that are positioned on the fork tines in a manner to be responsive to the load.

Various weighing arrangements heretofore proposed and used for fork lift trucks have involved various complications of structure in an effort to obtain a high degree of accuracy and to permit the loads to be weighed accurately regardless of the position of the load on the fork tines. Such arrangements have been necessarily expensive even though very accurate.

It is an object of my invention to provide a relatively inexpensive fork lift weighing apparatus employing electrical strain responsive means for weighing a load with a reasonable degree of accuracy regardless of where the load is placed on the fork tines.

A further object is to provide an improved weighing system of the electrical strain gage type for a fork lift truck that will be reasonably accurate, compact, and yet highly rugged and economical in manufacture and maintenance.

Other objects and advantages will be more apparent to those skilled in the art from the following description of the accompanying drawings in which.

Figure 1:
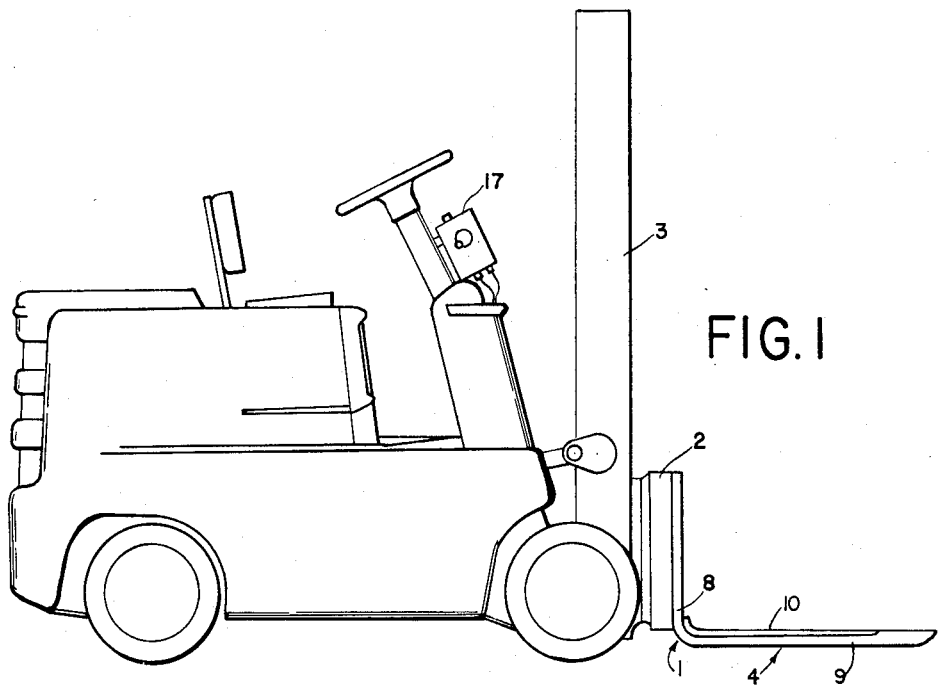
FIG. 1 is a side elevation of a fork lift truck embodying my improved weighing system.
Figure 2:
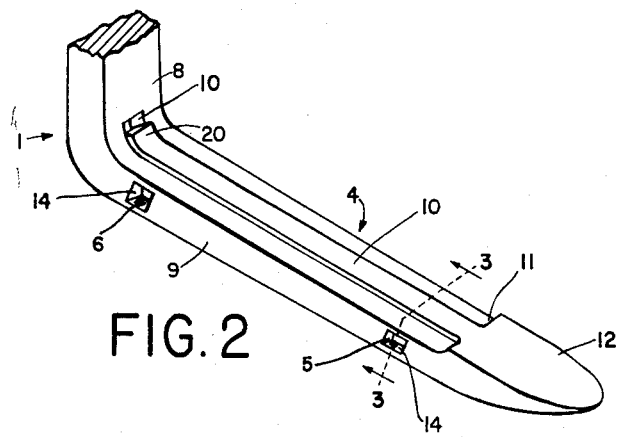
FIG. 2 is a perspective of one of the usual plurality of tines of the fork.
Figure 3:
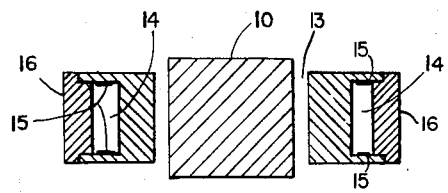
FIG. 3 is a transverse section taken substantially on the line of 3—3 of FIG. 2.
Figure 4:
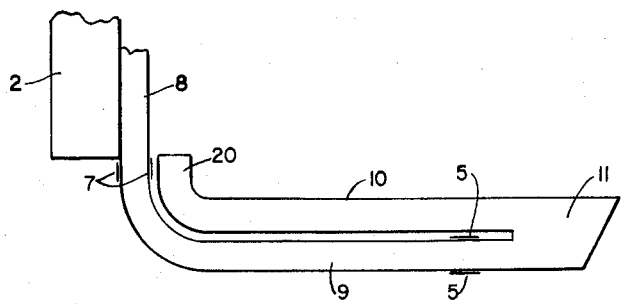
FIG. 4 is a modified arrangement of the gages.

In this particular embodiment of my invention I have shown a usual L-shaped truck fork generally indicated at 1 mounted upon a carriage 2 that is raised or lowered upon a vertical standard 3 all in a manner that is well known. The fork usually has a pair of horizontal parallel tines one of which is generally indicated at 4, FIG. 2. Loads on the tines may be weighed by measuring the strain induced therein by the load. To accomplish this, strain gages of any suitable type may be used but are preferably of the electrical resistance bonded filament type diagrammatically shown as located at the front and rear areas 5 and 6 of the fork tine in FIG. 2. Though in FIG. 4 the rear gages are shown as located at 7 on the vertical leg 8 of the fork. To permit the gages to be spaced as far apart as possible to obtain maximum electrical output and at the same time to obtain accurate measurement of loads regardless of where the load is placed along the length of the tines, I provide a novel arrangement of plural member tines. Each tine comprises an elongated strain sensitive member 9 projecting freely forwardly as a cantilever beam from the vertical leg 8 and a rearwardly projecting elongated cantilever load-supporting member 10 rigidly connected at 11 to the nose 12 of the tine. As shown in FIG. 3 the strain sensitive tine member has a slot 13 extending from leg 9 to a point near nose 12 of the tine. The load-supporting member has its upper surface spaced above the strain sensitive member so that the entire load is transmitted thereto only through the single point of the rigid connection 11. One arrangement for securing the gages to the tines so that they will be fully protected against damage is to provide recesses 14 in the side walls of the tines preferably on each side thereof with the upper and lower walls of these recesses being relatively thin so as to obtain maximum tension and compression strains induced in the tines by the load. Strain gages 15 are secured to each of these thin wall sections and the recess is closed by a suitable plug 16 having sealing rings if desired. The gages can be mounted directly on the outside of the tines if desired, as shown in FIG. 4 and suitably protected by a cover.

The gages are connected in any usual Wheatstone bridge arrangement and a suitable well known electronic instrument 17 for measuring the resistances in response to load is located near the driver's positon on the truck.

Heretofore it has been necessary to have the two sets of gages such as 5 and 6 disposed relatively near each other somewhat near the rear end of the tines in order that the weighing operation would be independent of the position of the load on the tines. This has seriously limited the feasibility of the use of strain gages directly on the tines for load measuring. By my improved double cantilever type of reversing plural member tine I overcome these difficulties and obtain an appreciably high gage output and yet allow the load to be positioned anywhere with respect to the lengthwise axis of the tines. The vertical height of the combined members of the tines is minimized in the preferred form by having the load carrying member disposed in the slot 13 but projecting above the upper surface of the member 9 sufficiently to prevent the load from having contact therewith.

Figure 5:
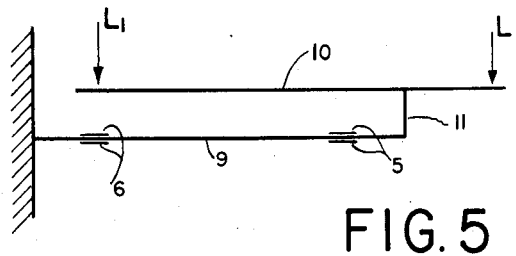
FIG. 5 is a diagrammatic illustration of the principle of my invention.

The results of my improved combination are diagrammatically illustrated in FIG. 5 where the load engaging member 10 is rigidly secured at 11 to the member 9. It is seen that regardless of where the load may be placed anywhere between its extremes L and $L_1$ such load will always be precisely transmitted to a point outside the sensing area of the two sets of strain gages thereby insuring maximum sensitivity and electrical output of the gages wholly independently of the load position. Also, if desired, the load engaging cantilever member of the tines may completely overlie the entire width thereof so as to provide complete physical protection to the tension gages if they are mounted directly on the upper surface of the tines as shown in FIG. 4. Compression strain gages are also mounted on the lower surface of the member with suitable cover protection. The load engaging element 10 may have a suitably upturned inner end 20 to prevent the load from being pushed against the vertical portion 8 of the fork which, if it occurred, would introduce possible inaccuracies in the weighing operation due to frictional contact between the member 8 and the load.

From the foregoing disclosure it is seen that I have provided a highly sensitive and yet rugged load-weighing means for fork lift trucks that has a high degree of freedom of positioning of the load on the tines without affecting the weighing accuracy.

It will, of course, be understood that various changes in details of construction and arrangement of parts may be made by those skilled in the art without departing from the spirit of the invention as set forth in the appended claims.

I claim:

1. A lift fork including strain sensitive and load-supporting members having rear and front ends, the strain sensitive member being supported at its rear end and extending freely forwardly as a cantilever toward its front end, the load supporting member being rigidly connected to the strain sensitive member at a point toward its front end and extending freely rearwardly as a cantilever toward its rear end, the load supporting member having a surface for engaging the load and holding it freely above the strain sensitive member, and strain gages mounted on the strain sensitive member at rearward and forward points thereof to measure the surface strains of the sensitive member introduced therein by an applied load, whereby a load placed at any point along the length of the load supporting member is always transmitted to the strain sensitive member through said rigid connection thereby causing load induced strains to be independent of the load position.

2. The combination set forth in claim 1 further characterized in that the strain sensitive member has an elongated slot and the load engaging member extends into said slot.

3. The combination set forth in claim 1 further characterized in that the strain sensitive member has a lateral recess provided with a surface near an outer horizontal surface of the member so that strains induced in the sensitive member by load are present in the recessed surface, and one of the strain gages being secured to such recess surface.

4. The combination set forth in claim 1 further characterized in that the rearwardly located strain gages are also mounted on the strain sensitive member.

5. The combination set forth in claim 1 further characterized in that the strain sensitive member has a vertical portion from which the horizontal portion extends forwardly, and the rearward strain gage being mounted on said vertical portion of the fork.

References Cited in the file of this patent
UNITED STATES PATENTS 2,935,213    Cellitti et al.            May 3, 1960

FOREIGN PATENTS 604,663    Germany             Oct. 25, 1934

OTHER REFERENCES

"The Strain Gage Primer," by Perry and Lissner, 1955, McGraw-Hill Book Company, Inc., pp. 204–212.